United States Patent [19]

Hewett et al.

[11] 3,872,091
[45] Mar. 18, 1975

[54] NEW 2β, 16β-DIAMINO-ANDROSTANES AND THEIR PREPARATION

[75] Inventors: Colin Leslie Hewett; David Samuel Savage, both of Glasgow, Scotland

[73] Assignee: Akzona Incorporated, Asheville, N.C.

[22] Filed: Nov. 26, 1973

[21] Appl. No.: 419,001

[30] Foreign Application Priority Data
Nov. 29, 1972 United Kingdom............... 55191/72

[52] U.S. Cl... 260/239.5, 260/239.55 R, 260/397.4, 260/397.5, 424/241
[51] Int. Cl............................................ C07c 173/10
[58] Field of Search................................ 260/239.5

[56] References Cited
UNITED STATES PATENTS
3,553,212  1/1971  Hewett et al. .................... 260/239.5

Primary Examiner—Elbert L. Roberts
Attorney, Agent, or Firm—Francis W. Young; Philip M. Pippenger; Hugo E. Weisberger

[57]         ABSTRACT

The invention relates to novel 2β,16β-diamino-17-unsubstituted-androstanes, to acid addition salts and quaternary ammonium derivatives of these compounds and to processes for their preparation.

The compounds have very interesting biological activities. The mono- and bis-quaternary ammonium salts of the above compounds have neuromuscular blocking activity. The 2β, 16β-diamino-3α-hydroxy(or 3α-acyloxy)-17-unsubstituted-androstanes according to the invention are neuromuscular blocking agents having a quick onset and short duration of action.

4 Claims, No Drawings

NEW 2β,16β-DIAMINO-ANDROSTANES AND THEIR PREPARATION

This invention relates to novel 2β,16β-diamino-17-unsubstituted-androstanes and to processes for their preparation.

More specifically, it relates to 2β,16β-diamino-17-unsubstituted androstanes having the formula:

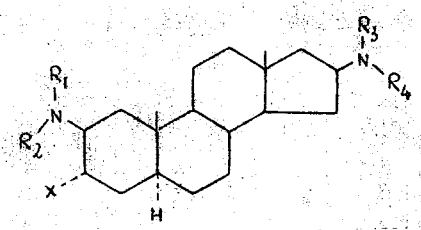

, wherein $R_1$, $R_2$, $R_3$ and $R_4$ each represent hydrogen, an alkyl group or an aralkyl group having 1–10 carbon atoms, or $R_1$, $R_2$ and/or $R_3$, $R_4$ form together with the nitrogen atom a heterocyclic ring, X represents H or OR, wherein R represents hydrogen or an acyl group derived from an organic carboxylic acid having 1–18 carbon atoms,
and acid addition salts and quaternary ammonium derivatives of these compounds.

The compounds according to the present invention are very interesting biologically active compounds. Of particular interest are the mono- and bis-quaternary ammonium salts of the above compounds derived from alkyl or substituted alkyl halides of which the alkyl group has 1–4 carbon atoms, in that they have a strong influence on the autonomic nervous system and are highly active neuromuscular blocking agents. In particular, when X = OR these compounds surprisingly have a quick onset and short duration of action wherein they differ from the corresponding 17-oxygenated compounds.

The compounds according to the present invention can be obtained by reacting a 2β-$NR_1R_2$-3α-hydroxy-17-unsubstituted-5α-androstan-16-one with an amine of the formula $HNR_3R_4$ in the presence of formic acid to give the corresponding 2β-$NR_1R_2$-3α-hydroxy-16β-$NR_3R_4$-5α-androstane. The starting 2β-$NR_1R_2$-3α-hydroxy-5α-androstan-16-one can be obtained by reacting a 2α,3α-epoxy-17-unsubstituted-5α-androstan-16-one with an amine of the formula $HNR_1R_2$. The 2α,3α-epoxy compound can be obtained by epoxidation of the corresponding Δ²-steroid, e.g. with a peracid such as peracetic acid.

The starting 2β-$NR_1R_2$-3α-hydroxy-5α-androstan-16-one may also be obtained by treating a 17β-sulphonic ester of a known 3α-acyloxy-2β-$NR_1R_2$-16β-amino-5α-androstan-17β-ol, such as the 17β-mesylate, under desulphonation conditions, e.g. by treatment with lithium bromide and lithium carbonate in dimethylformamide, to give the Δ¹⁶-enamine and hydrolysing the Δ¹⁶-enamine by alkali to the desired 16-ketone.

The Δ¹⁶-enamines can also be reduced directly to the compounds according to the invention, e.g. with Pt/$H_2$ or Pd/$H_2$.

The amines $HNR_1R_2$ and $HNR_3R_4$ can be the same or different. $R_1$, $R_2$, $R_3$ and $R_4$ have the meanings as given hereinbefore. Preferably, each represents an alkyl group or an aralkyl group having 1–10 carbon atoms, or $R_1$, $R_2$ and/or $R_3$, $R_4$ form together with the nitrogen atom a heterocyclic ring.

The alkyl group in the dialkylamino substituent, present in 2- and 16-positions, is preferably a lower alkyl group having 1–6 carbon atoms, such as a methyl, ethyl, propyl, isopropyl, butyl, pentyl or hexyl group.

The heterocyclic group is preferably a saturated heterocyclic group, such as a piperidino-, morpholino-, or an azabicyclo nonano group.

The reaction of the 2α,3α-epoxy-compound with the amine $HNR_1R_2$ is carried out at an elevated temperature, usually at 70°C to 250°C and preferably in the presence of water.

The reaction of the 16-keto-compound with the amine $HNR_3R_4$ is likewise carried out at an elevated temperature in the presence of formic acid.

The resulting 2β,16β-diamino-3α-hydroxy-5α-androstane compounds may be esterified in 3-position. The ester group may be derived from an organic carboxylic acid, perferably having 1–18 carbon atoms, such as acetic acid, propionic acid, butyric acid, valeric acid, caproic acid, oenanthic acid, decanoic acid, lauric acid, stearic acid, trimethyl acetic acid, t-butyl acetic acid, cyclopentyl propionic acid, cyclohexyl butyric acid, and phenyl-propionic acids. The esterification is preferably carried out with a functional derivative of the organic carboxylic acid, such as the acid anhydride or the acid chloride.

Another method for the preparation of compounds according to the present invention comprises starting from the known 5α-androstane-2,16-dione and converting it to 2β,16β-diamino-5α-androstanes by Leuckart-Wallach reaction with an amine having the formula $HNR_1R_2$ in the presence of formic acid.

The 2β,16β-diamino-compounds according to the invention can be converted into the acid-addition salts thereof derived from inorganic or organic acids such as hydrochlorides, citrates or pyruvates.

The 2β,16β-bis-quaternary-ammonium salts according to the invention may be prepared by allowing the corresponding 2β-$NR_1R_2$-16β-$NR_3R_4$ steroids to react with an alkyl halide in a suitable solvent such as methylene chloride at room temperature for 7 to 14 days or at an elevated temperature, e.g. 80°C for 6 to 12 hours. Since the 16-amino group is more reactive to alkyl halides than is the 2-amino group, the 16-monoquaternary ammonium salts may be prepared by treating the 2β,16β-diamino steroids with an alkyl halide in a solvent, e.g. ether, in which the formed 16-monoquaternary ammonium salts are sparingly soluble.

The 2β-amino-16β-monoquaternary ammonium salts can then be further treated with a different alkyl halide to give the corresponding 2β, 16β-bis-quaternary ammonium salts.

The alkyl halide used for the conversion of the amino groups present in 2- and/or 16-position into the quaternary ammonium derivatives thereof may be a saturated or an unsaturated alkylhalide, e.g. methyl bromide, methyl iodide, ethyl bromide, ethyl iodide, alkyl bromide or propargyl iodide.

A 3α-hydroxy group may be eliminated, if desired, by halogenation, e.g. with $PCl_5$, followed by reduction, e.g. with Zn and acetic acid.

The utility of the present compounds is an medicinal substances; in particular the mono- and bis-quaternary ammonium salts are neuromuscular blocking agents (muscle relaxants) in a manner similar to tubocurarine but having the advantage that they do not affect the cardiovascular system, nor do they release histamine, to the same extent.

The present quaternary ammonium compounds are intended particularly for human therapy where a quick onset and a short duration of action is wanted. In particular the compound 2β,16β-dipiperidino-5α-androstan-3α-ol acetate dimethobromide is administered by intravenous injection, in initial dosages between about 25 and 50 mg, followed if necessary by smaller supplementary dosages.

The following Examples illustrate the invention.

EXAMPLE I

5α-Androst-2-en-16-one (3.36 g) in chloroform (20.2 ml) was added with stirring over 2–3 minutes to a cooled suspension of sodium acetate (0.34 g) in 38/40 percent peracetic acid solution (3.5 ml; 1.5 mole). The mixture was stirred at 0°–10°C for 1 hour, then water was added and the product was extracted with ether. The ether extract was washed well with 1N sodium hydroxide solution and water, dried over magnesium sulphate and evaporated to dryness to give a colourless gum (3.43 g). Trituration with ether gave the 2α,3α-epoxide in colourless crystals (2.22 g), m.p. 167°–170°C.

A solution of 2α,3α-epoxy-5α-androstan-16-one (2.22 g) in piperidine (10 ml) and water 1.0 ml) was refluxed for 4 days, then evaporated to dryness and the residue dissolved in glacial acetic acid. Water was added to precipitate the non-basic material which was filtered off. The filtrate was basified with 10N potassium hydroxide solution to give a buff solid (approx. 2.1 g), which was dissolved in methylene chloride, dried over magnesium sulphate and evaporated to dryness to give a yellow gum (1.98 g). This was dissolved in methylene chloride and filtered through a column of alumina (4 × 0.5). The methylene chloride eluate was evaporated to dryness to give a pale yellow gum (1.94 g) which on trituration with ether gave the 2β-piperidine-3α-ol as an almost colourless solid (0.67 g), m.p. 172°–178°C. Three subsequent crops (combined Wt. 0.75 g) of similar purity were obtained from the mother liquor on the addition of (60°–80°) petroleum ether.

The following compounds were prepared in a similar manner:

2β-morpholino-5α-androstan-3α-ol-16-one
2β-azabicyclononano-5α-androstan-3α-ol-16-one
2β-pyrrolidino-5α-androstan-3α-ol-16-one
2β-dimethylamino-5α-androstan-3α-ol-16-one
2β-diethylamino-5α-androstan-3α-ol-16-one
2β-di-n-propylamino-5α-andorstan-3α-ol-16-one

EXAMPLE II

Methane-sulphonyl chloride (2.5 ml) was added dropwise to a stirred ice-cooled solution of 2β,16β-dipiperidino-5α-androstan-3α,17β-diol 3α-acetate (10.00 g) in methylene chloride (100.00 ml) containing a few drops of pyridine. The reaction was stirred at room temperature for 4 hours and then added to a suspension of ice in a saturated solution of potassium bicarbonate (100 ml). The mixture was stirred for 5 minutes, the product extracted with methylene chloride, the organic layer separated off, washed to pH 7–8 with water, dried (MgSO$_4$) and concentrated. The concentrate was filtered through a short column (1.5 × 0.5) of acid-washed Al$_2$O$_3$ to remove colour, and the eluate (300 ml) concentrated, and the methylene chloride replaced by ether to give the crystalline mesylate (11.5 g). Melting point of a pure sample is 170.5°–178°C.

Lithium bromide (2.30 g) and lithium carbonate (11.50 g) were added to a solution of 2β,16β-dipiperidino-5α-androstan-3α,17β-diol 3α-acetate 17β-mesylate (11.50 g) in dimethyl formamide (115.0 ml) and the mixture boiled under reflux for 60 minutes. The reaction was added to ice-water (400 ml) with stirring and the product extracted with ether. The insoluble material was filtered off, the filtrate washed twice with water, dried (MgSO$_4$) and evaporated to dryness to yield a dark brown gum (9.66 g). T.L.C. 1:1 heptane/acetone (alumina) Rf = 0.95 showed no starting mesylate.

The crude enamine (9.66 g) was dissolved in ethanol (50.00 ml), 10N KOH solution (9.7 ml) added and the mixture refluxed for 30 minutes. The reaction was cooled and the product precipitated out by addition of water (200 ml). The precipitate was filtered, washed with water and dried to yield a light brown solid (6.82 g). The solid was dissolved in toluene (40 ml) and filtered through a column (1.5 × 0.5) of neutral alumina and the toluene eluate (250 ml) evaporated to dryness to yield a pale yellow solid (6.41 g). The product was crystallised from ether to yield 2β-piperidino-3α-hydroxy-5α-androstan-16-one (5.8 g), m.p. 170°–177°C.

EXAMPLE III

A solution of 2β-piperidino-3α-hydroxy-5α-androstan-16-one (1.42 g) in piperidine (17 ml) and formic acid (2.8 ml) was refluxed for 14 hours, then cooled, diluted with water and extracted with ether. The ether extract was washed with potassium bicarbonate solution and water, dired over magnesium sulphate and evaporated to dryness to give a yellow gum (1.80 g). Trituration with ether gave 2β,16β-dipiperidino-3α-hydroxy-5α-androstane as almost colourless crystals (1.1 g), m.p. 214°–221°C.

The dipiperidino-3α-ol (860 mg) was dissolved in pyridine (5 ml) and acetic anhydride (5 ml) and the solution was allowed to stand on the water-bath for 1 hour. The solution was cooled, water was added and the product was extracted with ether. The ether extract was washed with potassium bicarbonate solution and water, dried over magnesium sulphate and evaporated to dryness to give a slightly yellow gum, which on trituration with ether gave 2β,16β-dipiperidino-3α-acetoxy-5α-androstane as colourless crystals (180 mg), m.p. 176°–183°C.

The following compounds were prepared in a similar manner:

2β-piperidino-16β-pyrrolidino-5α-androstan-3α-ol
2β-piperidino-16β-pyrrolidino-5α-androstan-3α-ol acetate
2β-piperidino-16β-pyrrolidino-5α-androstan-3α-ol propionate
2β-piperidino-16β-morpholino-5α-androstan-3α-ol
2β-piperidino-16β-morpholino-5α-androstan-3α-ol acetate
2β-piperidino-16β-morpholino-5α-androstan-3α-ol pivalate
2β-piperidino-16β-dimethylamino-5α-androstan-3α-ol
2β-piperidino-16β-dimethylamino-5α-androstan-3α-ol acetate
2β-piperidino-16β-diethylamino-5α-androstan-3α-ol 2β-piperidino-16β-diethylamino-5α-androstan-3α-ol acetate
2β-piperidino-16β-diethylamino-5α-androstan-3α-ol phenylacetate
2β-pyrrolidino-16β-piperidino-5α-androstan-3α-ol
2β-pyrrolidino-16β-piperidino-5α-androstan-3α-ol acetate
2β-azabicyclononano-16β-piperidino-5α-androstan-3α-ol acetate
2β-pyrrolidino-16β-morpholino-5α-androstan-3α-ol
2β-pyrrolidino-16β-morpholino-5α-androstan-3α-ol acetate
2β-pyrrolidino-16β-dimethylamino-5α-androstan-3α-ol
2β-pyrrolidino-16β-dimethylamino-5α-androstan-3α-ol acetate
2β-morpholino-16β-piperidino-5α-androstan-3α-ol
2β-morpholino-16β-piperidino-5α-androstan-3α-ol acetate
2β-morpholino-16β-pyrrolidino-5α-androstan-3α-ol
2β-morpholino-16β-pyrrolidino-5α-androstan-3α-ol acetate
2β-morpholino-16β-dimethylamino-5α-androstan-3α-ol
2β-morpholino-16β-dimethylamino-5α-androstan-3α-ol acetate
2β,16β-dipyrrolidino-5α-androstan-3α-ol
2β,16β-dipyrrolidino-5α-androstan-3α-ol acetate
2β,16β-dimorpholino-5α-androstan-3α-ol
2β, 16β-dimorpholino-5α-androstan-3α-ol acetate
2β,16β-bis-(dimethylamino)-5α-androstan-3α-ol
2β,16β-bis-(dimethylamino)-5α-androstan-3α-ol acetate
2β,16β-bis-(diethylamino)-5α-androstan-3α-ol
2β,16β-bis-(diethylamino)-5α-androstan-3α-ol acetate
2β,16β-bis-(di-n-propylamino)-5α-androstan-3α-ol
2β,16β-bis-(di-n-propylamino)-5α-androstan-3α-ol acetate.

EXAMPLE IV

A Leuckart-Wallach condensation of 5α-androstan-2,16-dione with piperidine in the presence of formic acid yielded a product which crystallised from ether to give 2β,16β-dipiperidino-5α-androstane, m.p. 153°–160°C.

The following compounds were prepared in a similar manner:
2β,16β-dimorpholino-5α-androstane
2β,16β-dipyrrolidino-5α-androstane
2β,16β-bis-(dimethlamino)-5α-androstane
2β,16β-bis-(diethylamino)-5α-androstane.

EXAMPLE V

Methyl bromide (1.0 g) was added a solution of 2β,16β-dipiperidino-3α-acetoxy-5α-androstane (460 mg) in freshly distilled methylene chloride (1.2 ml). The solution was stored at room temperature and further portions (1.0 g) of methyl bromide were added after 7 days and 14 days. The solvents were removed under reduced pressure after a total of 17 days, the residue dissolved in 3:1 ethyl acetate-isopropanol and chromatographed on acid-washed alumina. Elution with isopropanol gave a colourless gum (600 mg) which was crystallised twice from isopropanol-acetone to give colourless crystals (320 mg) of 2β,16β-dipiperidino-3α-acetoxy-5α-androstane dimethobromide, m.p. 271°–282°C.

The following compounds were prepared in a similar manner:
2β,16β-dipiperidino-5α-androstan-3α-ol acetate dimethiodide
2β-piperidino-16β-pyrrolidino-5α-androstan-3α-ol dimethobromide
2β,16β-dipiperidino-5α-androstan-3α-ol dimethobromide
2β-piperidino-16β-pyrrolidino-5α-androstan-3α-ol acetate dimethobromide
2β-piperidino-16β-pyrrolidino-5α-androstan-3α-ol propionate dimethobromide
2β-piperidino-16β-morpholino-5α-androstan-3α-ol dimethobromide
2β-piperidino-16β-morpholino-5α-androstan-3α-ol acetate dimethobromide
2β-piperidino-16β-morpholino-5α-androstan-3α-ol pivalate dimethobromide
2β-piperidino-16β-dimethylamino-5α-androstan-3α-ol dimethobromide
2β-piperidino-16β-dimethylamino-5α-androstan-3α-ol acetate dimethobromide
2β-piperidino-16β-diethylamino-5α-androstan-3α-ol dimethobromide
2β-piperidino-16β-diethylamino-5α-androstan-3α-ol acetate dimethobromide
2β-piperidino-16β-diethylamino-5α-androstan-3α-ol phenylacetate dimethobromide
2β-pyrrolidino-16β-piperidino-5α-androstan-3α-ol dimethobromide
2β-pyrrolidino-16β-piperidino-5α-androstan-3α-ol acetate dimethobromide
2β-azabicyclononano-16β-piperidino-5α-androstan-3α-ol acetate dimethobromide
2β-pyrrolidino-16β-morpholino-5α-androstan-3α-ol dimethobromide
2β-pyrrolidino-16β-morpholino-5α-androstan-3α-ol acetate dimethobromide
2β-pyrrolidino-16β-dimethylamino-5α-androstan-3α-ol dimethobromide
2β-pyrrolidino-16β-dimethylamino-5α-androstan-3α-ol acetate dimethobromide
2β-morpholino-16β-piperidino-5α-androstan-3α-ol dimethobromide
2β-morpholino-16β-piperidino-5α-androstan-3α-ol acetate dimethobromide
2β-morpholino-16β-pyrrolidino-5α-androstan-3α-ol dimethobromide
2β-morpholino-16β-pyrrolidino-5α-androstan-3α-ol acetate dimethobromide
2β-morpholino-16β-dimethylamino-5α-androstan-3α-ol dimethobromide
2β-morpholino-16β-dimethylamino-5α-androstan-3α-ol acetate dimethobromide
2β,16β-dipyrrolidino-5α-androstan-3α-ol dimethobromide
2β,16β-dipyrrolidino-5α-androstan-3α-ol acetate dimethobromide
2β,16β-dimorpholino-5α-androstan-3α-ol dimethobromide
2β,16β-dimorpholino-5α-androstan-3α-ol acetate dimethobromide
2β,16β-bis-(dimethylamino)-5α-androstan-3α-ol dimethobromide
2β,16β-bis-(dimethylamino)-5α-androstan-3α-ol acetate dimethobromide 2β,16β-bis-(diethylamino)-5α-androstan-3α-ol dimethobromide
2β,16β-bis-(diethylamino)-5α-androstan-3α-ol acetate dimethobromide
2β,16β-bis-(di-n-propylamino)-5α-androstan-3α-ol dimethobromide
2β,16β-bis-(di-n-propylamino)-5α-androstan-3α-ol acetate dimethobromide
2β,16β-dimorpholino-5α-androstane dimethobromide
2β,16β-dipyrrolidino-5α-androstane dimethobromide
2β,16β-bis-(dimethylamino)-5α-androstane dimethobromide
2β,16β-bis-(diethylamino)-5α-androstane dimethobromide.

EXAMPLE VI

Methyl bromide (9.9 g) was added to a solution of 2β,16β-dipiperidino-5α-androstan-3α-ol acetate (500 mg) in ether (30 ml) and the mixture kept at 20° for 72 hours. The crystalline precipitate (0.69 g) was filtered off and crystallised from isopropanol acetone to give N-(2β-piperidino-3α-acetoxy-5α-androstan-16β-yl)-N-methyl piperidinium bromide, m.p. 222°–225°C (with decomposition).

The following compounds were prepared in a similar manner:
N-(2β-piperidino-3α-acetoxy-5α-androstan-16β-yl)-N-allyl piperidinium bromide
N-(2β-piperidino-3α-acetoxy-5α-androstan-16β-yl)-N-propargyl piperidinium bromide
N-(2β-pyrrolidino-3α-acetoxy-5α-androstan-16β-yl)-N-methyl piperidinium bromide
N-(2β-morpholino-3α-acetoxy-5α-androstan-16β-yl)-N-methyl piperidinium iodide
N-(2β-dimethylamino-3α-acetoxy-5α-androstan-16β-yl)-N-methyl piperidinium bromide.

EXAMPLE VII

Methyl bromide (3 g) was added to solution of N-(2β-piperidino-3α-acetoxy-5α-androstan-16β-yl)-N-allyl piperidinium bromide (600 mg) in methylene chloride (3 ml) and the reaction maintained at 20° for 14 days. The product was isolated in the usual manner and crystallised from isopropanol:acetone to give 3α-acetoxy-2β(1'-methyl-1'-piperidino)-16β-(1''-allyl-1''-piperidino)-5α-androstane dimethobromide.

The following compounds were prepared in a similar manner:
3α-acetoxy-2β(1'-allyl-1'-piperidino)-16β-(1''-methyl-1''-piperidino)-5α-androstane dimethobromide
3α-acetoxy-2β(1'-methyl-1'-piperidino)-16β-(1''-propargyl-1''-piperidino)-5α-androstane dimethobromide.

What is claimed is:

1. A 2β, 16β-diamino-5α-androstane compound selected from the group consisting of said compound unsubstituted in the other positions, and said compound having as the only other substituent in 3α-position a substituent selected from the group consisting of hydroxyl and acyloxy wherein acyloxy is derived from an organic carboxylic acid having 1 to 18 carbon atoms, and the pharmaceutically acceptable acid addition salts and quaternary ammonium salts thereof.

2. A 2β, 16β-diamino-androstane selected from the group consisting of a compound of the formula,

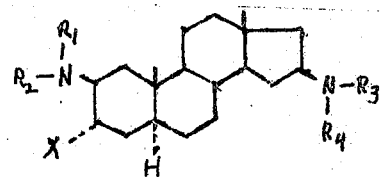

where X is selected from the group consisting of hydrogen, hydroxyl, and acyloxy derived from an organic carboxylic acid having 1 to 18 carbon atoms; $NR_1R_2$ and $NR_3R_4$ are identical or different groups selected from the group consisting of a five-, six-, and seven-membered saturated nitrogen heterocyclic ring, and a dialkylamino group the alkyl of which has 1 to 6 carbon atoms; and the pharmaceutically acceptable acid addition salts and quaternary ammonium salts thereof.

3. A 2β, 16β-diamino-androstane pharmaceutically acceptable quaternary ammonium salt of the formula

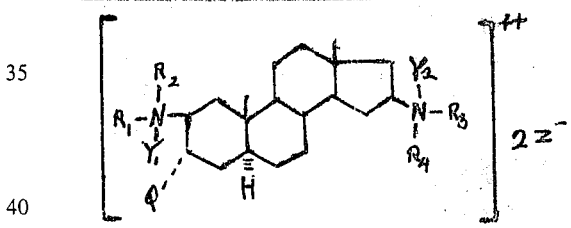

where $NR_1R_2$ and $NR_3R_4$ are identical or different groups selected from the group consisting of a five-, six-, and seven-membered saturated nitrogen heterocyclic ring, and a dialkylamino group the alkyl of which has 1 to 6 carbon atoms; Q is selected from the group consisting of hydrogen, hydroxyl, and acyloxy derived from an organic carboxylic acid having 1 to 6 carbon atoms; $Y_1$ and $Y_2$ are each alkyl having 1 to 6 carbon atoms; and Z is a halogen atom.

4. 2β,16β-dipiperidino-5α-androstan-3α-ol acetate dimethobromide.

* * * * *